Feb. 5, 1957     L. R. BELL     2,780,108
CHAIN SHORTENING DEVICE
Filed July 10, 1953
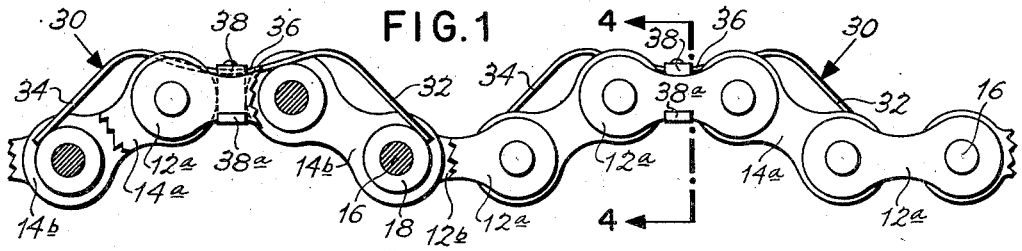
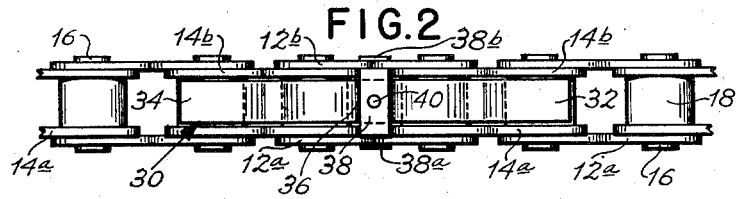
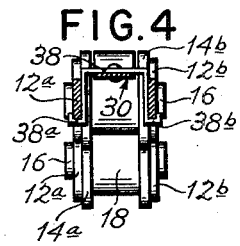
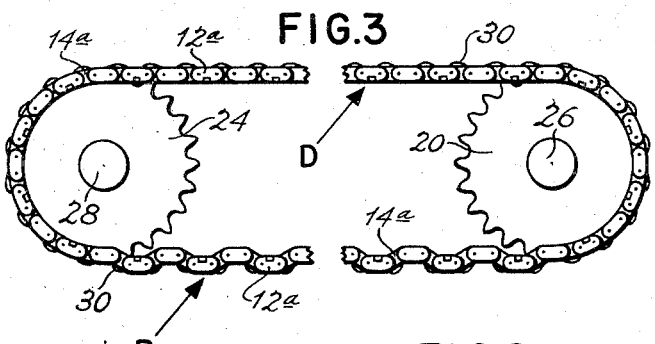
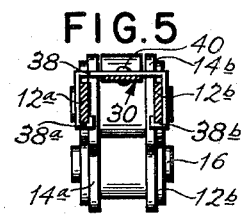
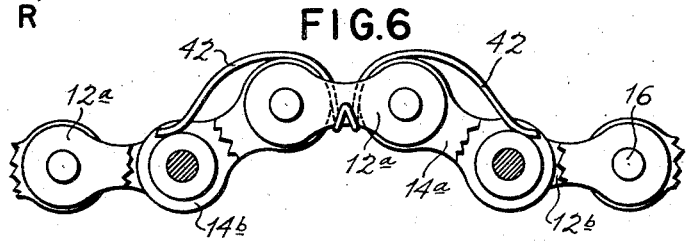
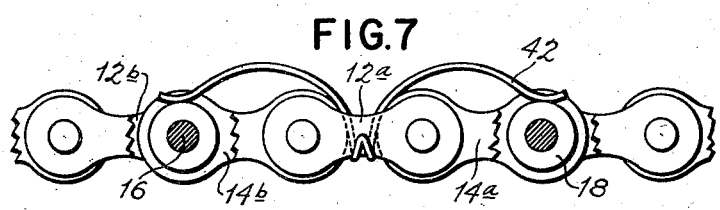
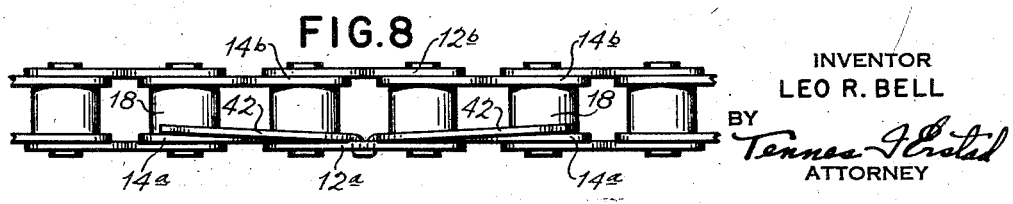
INVENTOR
LEO R. BELL
BY
ATTORNEY

2,780,108

CHAIN SHORTENING DEVICE

Leo R. Bell, Snyder, N. Y., assignor to American Machine & Foundry Co., a corporation of New Jersey Application July 10, 1953, Serial No. 367,177

3 Claims. (Cl. 74—242.8)

This invention relates to automatic chain shortening or tensioning methods and devices and more particularly to a spring clip which may be readily snapped on to conventional sprocket chains to effect an automatic shortening of the outstretched length thereof.

Heretofore, various devices have been designed for automatically taking up the slack of sprocket chains. In some cases spring tensioned take-up sprockets or rollers have been used for this purpose. In other cases, means have been built into the chain at the time of manufacture for effecting an automatic contraction of the outstretched length of the chain. These various devices have not been entirely satisfactory because they often required special machine design to accommodate such devices. When such shortening devices were built into a sprocket chain at the time of manufacture, it added materially to the cost of the chains.

It is an object of the present invention to provide a chain shortening device which may be readily applied to conventional sprocket chains at any time, without any modification of the chain design.

A further object of the invention is to provide a chain shortening device which is economical to construct and may be quickly applied to sprocket chains without having to remove them from a machine.

A further object is to provide a spring actuated chain shortening clip which can be attached to sprocket chains without taking up a more substantial amount of space than is already occupied by a chain.

Another object is to provide a chain shortening device which will not damage or cause wear on either the sprockets or on the chain.

Other objects and features of the invention will appear as the description of the particular physical embodiment selected to illustrate the invention progresses. In the accompanying drawings, which form a part of this specification, like characters of reference have been applied to corresponding parts throughout the several views which made up the drawings.

Fig. 1 is a side elevation partly in section of a chain having the spring clip affixed thereto;

Fig. 2 is a plan view of the same;

Fig. 3 is a side elevation of a chain provided with the spring clips;

Fig. 4 is a sectional end elevation taken on line 4—4 of Fig. 1;

Fig. 5 is a sectional end elevation of a chain illustrating a modified form of spring fastening;

Fig. 6 is a chain with a modified form of spring clip in retracted position;

Fig. 7 illustrates the same spring clip with the chain in expanded condition; and Fig. 8 is a plan view of the same.

In order to illustrate the invention, I have taken an ordinary sprocket chain as shown in Figs. 1 to 4 to which I have applied my chain shortening spring clip. The conventional sprocket chain consists of pairs of spaced links $12a$ and $12b$ which are connected to adjacent links $14a$ and $14b$ by means of pin 16 which may be provided with suitable spacing rollers 18. The roller chains or sprocket chains used to illustrate the invention are of a conventional design which travel over sprockets 20 and 24, rotating on their respective shafts 26 and 28 in a manner well known in the art.

As is well known, when power is exerted on a sprocket chain, whether the chain be used in a complex machine or on such a simple device as a bicycle, one side of the chain has tension applied thereto while another portion of the chain has a tendency to be slack. In a bicycle driving chain the return runner of the chain is slack while the driving side of the chain is taut.

It is also well established that sprocket chains are constructed in various sizes and designs, some having rollers, for example, and hollow studs, while others do not employ rollers and use solid studs. One of the principal advantages of the present invention is that it may be readily adapted to be used with such various types of sprocket chains.

The invention consists of a spring 30 having outwardly extending arms 32 and 34 which are bent so that the ends are in a different plane than the center portion 36 of the spring 30.

The center portion 36 of the spring 30 is so made that it may be snapped on to one portion of the sprocket chain so as to cause the spring arms 32 and 34 to urge the adjoining sprocket links out of a straight line and thereby effect a shortening of the outstretched length of the sprocket chain. Springs 30 are placed at predetermined spaced intervals along the sprocket chain as shown in Fig. 3 so as to achieve a shortening of the outstretched length of the slack portion of the chain.

The snap-on spring may be any of a number of designs such as a flat type of spring 30 as illustrated in Figs. 1–5 or may consist of a wire type spring such as shown in Figs. 6–8. There are several ways in which the center portion 36 of the spring 30 may be secured to the links of the sprocket chain. For example, the spring itself may be shaped so that it has laterally extending arms which hook onto the link so as to secure the center portion 36 of the spring 30 against movement relative to the link to which it is attached.

I have preferred, for purposes of simplicity, to show how a U-shaped transverse member 38 can be employed in conjunction with the spring 30 over which it is seated so that it seats itself over the spring and its downwardly extending arms $38a$ and $38b$ pass between oppositely spaced links $12a$ and $12b$ and snap onto the undersides thereof as shown in Fig. 4.

If desired, the transverse spring holding clip 38 could be made slightly wider so that the legs would pass downwardly on the outside of the oppositely spaced links $12a$ and $12b$ as shown in Fig. 5. While I have shown the spring 30 as being secured to the transverse member 38 by means of a suitable rivet 40, this rivet may be omitted, because the springs have been tested both with and without the rivet 40 and have been found to attach satisfactorily either way.

When a wire type spring 42 is employed, such as in Figs. 6, 7, and 8, one may employ a fastening clip similar to 38 used in Fig. 1. It is also possible to form one or more hooks directly in the wire spring as shown in Figs. 6, 7, and 8, which can be hooked under either or both of the sprocket links. The latter arrangement has also been found to operate quite satisfactorily.

It will thus be seen from the foregoing that I have provided a simple and reliable chain shortening device which may be readily attached to conventional sprocket chains to effect a resilient shortening action of the outstretched portion of a chain. The invention therefore has a great deal of utility regardless of whether sprocket chains are presently in use or whether they are to be applied to sprocket chains before they are placed in a machine.

As shown in Fig. 3 when the chain travels around a driven sprocket it becomes taut, thereby aligning all the links in the pull run in a straight line. The springs 30 or 42 yield under this driving force to permit the alignment of such sprocket links. It should be noted that when passing around a sprocket, the springs urge the chain to assume a curve in the same direction as the curve imparted to the chain naturally when passing around the sprocket. When the chain has travelled around the driving sprocket it is no longer under a pulling force and, therefore, slackens up. At this point the legs of springs 30 or 42 come into action and force the links out of line which results in a shortening of the outstretched length of the chain.

Due to the fact that said spring clips can easily be attached to or detached from a sprocket chain, one chain can continue to be used even though various alterations may be necessary such as lengthening or shortening the distance between sprockets or changing the size of sprockets, etc. By adding or detaching a number of spring clips to a chain, a standard length of chain may be used to serve various requirements and assures a snug fitting chain in each instance.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. In combination with a sprocket chain having elongated links making up a conventional sprocket chain, a chain shortening device comprising a spring having a hook formed at the center of the spring hooked on to a sprocket chain link, resilient arms extending outwardly from said hook and urging said hook in one direction while urging adjoining links in an opposite direction so as to urge said adjoining links out of a straight line, said hook and arms being arranged not to extend beyond the width of the chain and to closely hug the same.

2. In combination with a sprocket chain having elongated links making up a conventional sprocket chain, a chain shortening device comprising an elongated spring having a hook bent in the center thereof securing the center portion of said spring to a conventional elongated link of said sprocket chain by hooking around the middle of said link, said spring having a configuration which causes the outwardly extending ends of the spring to engage with the far ends of the adjoining chain links to urge them out of a straight line without materially extending beyond the thickness of the chain.

3. In combination with a sprocket chain having elongated links making up a conventional sprocket chain, a chain shortening device comprising a plurality of springs each having outwardly extending arms which are of a length longer than a single sprocket chain link, and a hook formed at the center of each of the springs attaching the center portion of said springs to said conventional sprocket chain at predetermined intervals by hooking the hook on the link on one side of the sprocket chain to cause the extending arms of each spring to engage the opposite sides of the adjoining links of said conventional sprocket chain to resiliently urge them out of a straight line without materially increasing the thickness of the chain.

References Cited in the file of this patent
UNITED STATES PATENTS

| | | |
|---|---|---|
| 615,203 | Woodcock | Nov. 29, 1898 |
| 1,208,234 | Ternstedt | Dec. 12, 1916 |

FOREIGN PATENTS

| | | |
|---|---|---|
| 12,985 | Great Britain | 1914 |
| 197,158 | Switzerland | July 16, 1938 |
| 965,614 | France | Feb. 22, 1950 |